United States Patent [19]

Fagard et al.

[11] Patent Number: 5,592,198
[45] Date of Patent: Jan. 7, 1997

[54] TERMINAL FOR MAN-MACHINE DIALOGUE WITH A COMPUTER SYSTEM USING PLURAL VIEWING ELEMENTS

[75] Inventors: P. Fagard, Montigny Le Bretonneux; Isabelle Jahier, Paris, both of France

[73] Assignee: Sextant Avionique, Meudon La Foret, France

[21] Appl. No.: 400,197

[22] Filed: Mar. 3, 1995

Related U.S. Application Data

[63] Continuation of Ser. No. 194,525, Feb. 10, 1994, abandoned.

[30] Foreign Application Priority Data

Mar. 12, 1993 [FR] France .................................. 93 02981

[51] Int. Cl.$^6$ ...................................................... G09G 5/00
[52] U.S. Cl. ................................................ 345/173; 345/1
[58] Field of Search ................................. 345/1, 173, 174, 345/175, 176, 177, 178, 202, 119, 104, 2; 340/971, 973; 382/56; 434/38, 43, 69, 71, 323, 300, 362, 365, 372; 273/148 B, 85 G; 74/471 XY

[56] References Cited

U.S. PATENT DOCUMENTS

| | | |
|---|---|---|
| 3,701,945 | 10/1972 | Gallant et al. . |
| 4,413,314 | 11/1983 | Slater et al. ............................. 345/173 |
| 4,584,603 | 4/1986 | Harrison ............................. 273/148 B |
| 4,601,003 | 7/1986 | Yoneyama et al. . |
| 4,688,443 | 8/1987 | Fabre et al. ......................... 74/471 XY |
| 4,710,759 | 12/1987 | Fitzgibbon ............................. 345/175 |
| 4,755,811 | 7/1988 | Slavin et al. ............................. 345/173 |
| 4,760,388 | 7/1988 | Tatsumi et al. ............................. 345/1 |
| 4,845,495 | 7/1989 | Bollard et al. ......................... 340/973 |
| 4,845,645 | 7/1989 | Matin et al. ............................. 345/119 |
| 4,846,694 | 7/1989 | Erhardt ................................... 345/104 |
| 4,976,438 | 12/1990 | Tashiro ................................. 273/85 G |
| 5,025,411 | 6/1991 | Tallman et al. ......................... 345/173 |
| 5,347,628 | 9/1994 | Brewer et al. . |

FOREIGN PATENT DOCUMENTS

| | | |
|---|---|---|
| 0275192 | 7/1988 | European Pat. Off. . |
| 2164301 | 3/1986 | United Kingdom ..................... 434/71 |

OTHER PUBLICATIONS

Tebo, A. R. et al. "Cockpit Displays–Works of Ingenuity and Splendor." *EOSD–Electric–Optical Systems Design*. vol. 13, No. 7. Jul. 1981. (Chicago, IL, USA). pp. 31–44.

*Primary Examiner*—Richard Hjerpe
*Assistant Examiner*—Regina Liang
*Attorney, Agent, or Firm*—Browdy and Neimark

[57] ABSTRACT

The terminal embodying the invention comprises a touch-sensitive screen of reduced dimensions, having the resources required to display images representative of those of the viewing elements of the system, irrespective of their format, resolution or content, these images defining sensitive areas that the operator can designate to the system through manual action, a device enabling transmission to the system of information corresponding to the area designated by the operator, a device enabling validation of the area designated by the operator, and a device enabling selection of the above-mentioned images. The invention applies notably to aircraft cockpit equipment.

15 Claims, 2 Drawing Sheets

_5,592,198_

TERMINAL FOR MAN-MACHINE DIALOGUE WITH A COMPUTER SYSTEM USING PLURAL VIEWING ELEMENTS

This application is a continuation of application Ser. No. 08/194,525, filed Feb. 10, 1994 now abandoned.

BACKGROUND OF THE INVENTION

1. Field of the Invention

This invention relates to a terminal for man-machine dialogue with a computer system using plural display and/or signalling elements.

It applies notably, though not exclusively, to the setting up of a control center providing rapid access to a command or parameter to be modified, which is displayed on any one of the viewing devices equipping an aircraft cockpit.

2. Description of the Prior Art

Generally, it is known that in installations of this kind, several solutions have already been proposed enabling needs to be met as regards access and modification of parameters displayed on the viewing devices.

A first solution consists in equipping the viewing screens with touch-sensitive surfaces providing direct access to the parameters displayed thereon which are to be modified or designated.

This solution, which is incorporated into the viewing device and which provides rapid and instinctive access to the data to be modified, has a certain number of drawbacks, such as:

- alteration of the images due to the presence of the touch-sensitive surface on the viewing screen,
- the appearance of finger marks on the screen, through normal utilization of the touch-sensitive surface,
- a high cost due To the fact that it requires as many touch-sensitive surfaces as there are viewing screens,
- a certain fragility and a risk of wear of the touch-sensitive surface which can cause a visual hindrance (scratches, alteration of the anti-reflection treatment, etc.), or even failures.

This solution also imposes that the different display screens be disposed within reach of the operator.

A second solution uses an architecture in which a specific piece of equipment, such as a touch-sensitive work board, enables a cursor to be displaced onto the datum to be modified, which is displayed on the screen of a viewing device selected among n such devices.

This solution has the advantage of being less costly (all the less so that the number of visual displays to be commanded is high), of being very flexible in use (cursor mode, absolute pointer mode, relative pointer mode, etc.) and of being satisfactorily reliable and sturdy.

However, it has numerous drawbacks due to the fact that:
- there is no feedback on action performed on the work board,
- the operating modes are not obvious (the work board is quiescent),
- the designation of parameters close to one another on a laden screen can be difficult (need for gestural finesse often incompatible with flight conditions, in particular in a weapon-carrying plane).

This solution, which increases the workload for the pilot, is therefore penalizing.

OBJECT OF THE INVENTION

The main object of this invention is to remedy the preceding disadvantages by accumulating the advantages of the previously disclosed solutions.

SUMMARY OF THE INVENTION

Accordingly, it provides a terminal enabling dialogue between an operator and a computer system using at least one processor and several viewing elements, this terminal comprising a touch-sensitive screen of reduced dimensions having the resources required to display images representative of those of said viewing elements, irrespective of their format, resolution or content, these images defining sensitive areas that the operator can designate to the system through manual action on the touch-sensitive screen of the terminal, a means enabling transmission to the system of information corresponding to the area designated by the operator, a means enabling validation of the area designated by the operator, and a means enabling selection of the above-mentioned images.

The above-mentioned sensitive areas can, of course, be associated with multiple functions such as, e.g. commands, entries, parameter incrementations, etc. In this case, each area can comprise inscriptions indicating its nature, function, the parameter to be modified, etc., as the case may be.

Advantageously, the terminal can comprise a means enabling the selection of one or more images distinct from those of the viewing elements, in order to enable the operator to engage in direct dialogue with the system or even with the terminal alone, independently of the system.

BRIEF DESCRIPTION OF THE DRAWINGS

Further features and advantages of the invention will be apparent from embodiments of the invention described, by way of non-limiting examples, in reference to the corresponding accompanying drawings in which.

DESCRIPTION OF THE PREFERRED EMBODIMENTS

Figure 1:
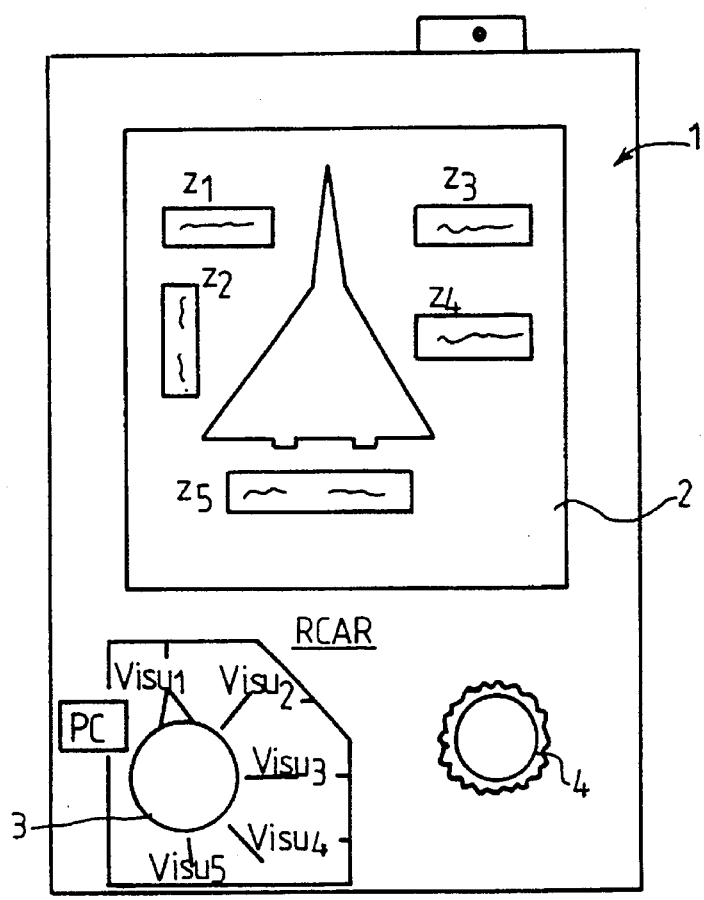
FIG. 1 is a schematic view of a communications terminal of the rapid access control center type (RCAR) intended to equip an aircraft cockpit.

As represented in FIG. 1, the RCAR terminal embodying the invention comes in the form of a parallelepiped box of which the front side 1 is largely taken up by a touch-sensitive screen 2 which can e.g. consist in a liquid crystal cell covered with a transparent sensitive surface, of the touch-control keyboard type, which incorporates at least one sensitive area of detection enabling high designation resolution according to the known principle of so-called continuous touch-sensitive surfaces.

Advantageously, the touch-sensitive surface 15 of the screen 2 is mounted on an effort detection device 16 (FIG. 4) which provides at least one identification signal when an effort exerted on the touch-sensitive surface 15 rises above at least one predetermined threshold. This signal can be used to filter spurious stresses or even to distinguish light touching of the screen by the operator's hand which, even if they have caused a change of status on the touch-sensitive surface 15, must not be taken into account by the system in the same way as a more pronounced solicitation.

On the part not taken up by the screen 2, the front side 1 is equipped with a selector knob 3, that can be set to six positions, PC and VISU1, VISU2 . . . VISU5, and a cordless tuner 4 comprising an axially mobile knob with spring return motion, which is rotated to bring about an incrementation or decrementation, and is axially displaced (under the effects of pressure) for validation purposes.

Figure 2:
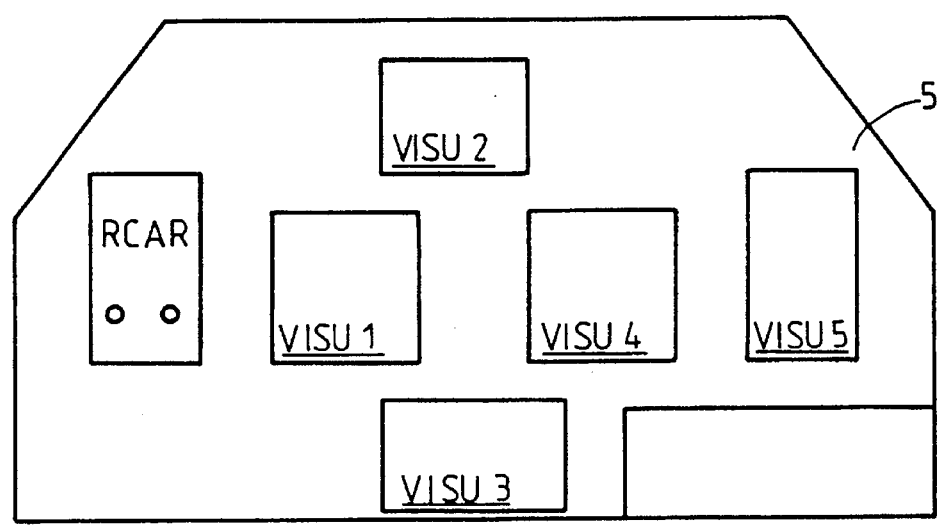
FIG. 2 shows an architecture of an instrument panel on an aircraft, integrating a communications terminal.

As represented in FIG. 2, the RCAR terminal can be integrated into an instrument panel 5 including five other display and/or viewing elements, respectively called VISU1 . . . VISU5.

In this case, it comprises a means enabling the displaying on the screen 2 of an image representative of that of the display element corresponding to the one indicated by the selector, in this instance the display element VISU1.

The PC position (control center) serves to switch to a terminal-specific operating mode, in which the screen displays an image specific to it and which enables the operator to engage, with the terminal, in a dialogue independent of the display and/or viewing elements VISU1 to VISU5.

The RCAR terminal could, of course, be installed elsewhere rather than on the instrument panel (e.g. on the center seat between the pilot and copilot) provided, however, it is within the operator's reach and field of vision.

Figure 3:
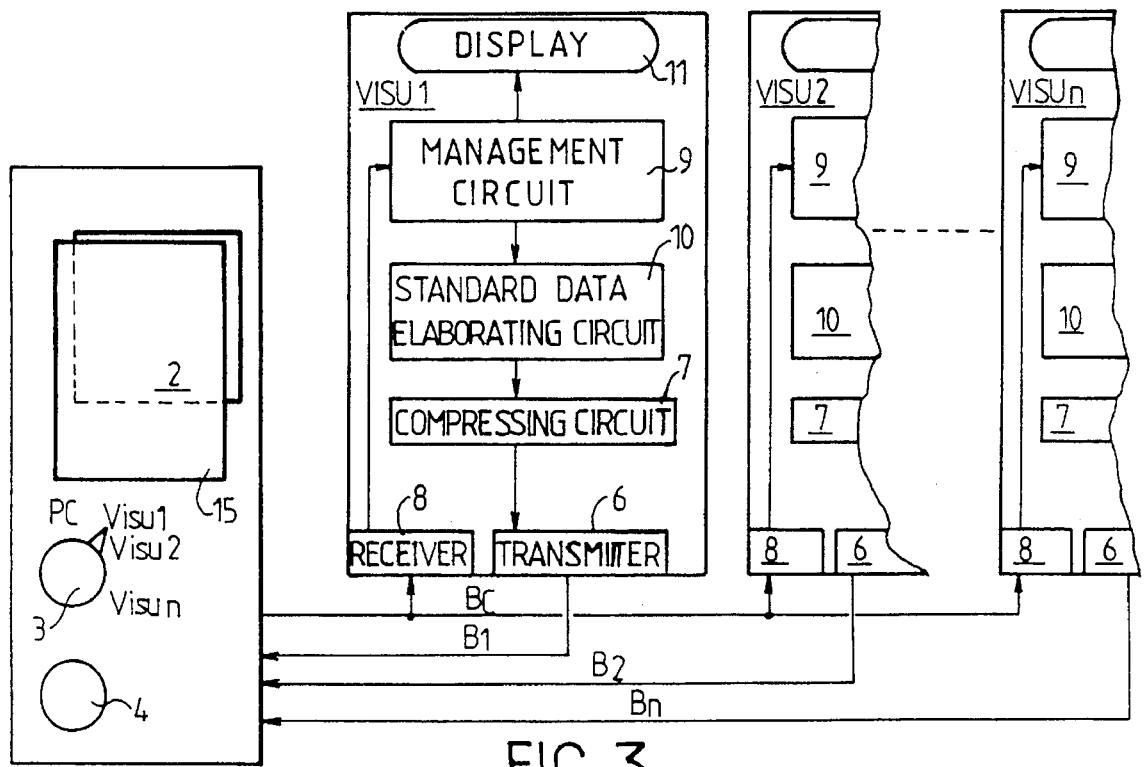
FIG. 3 is a diagram of the link-up of the communications terminal with all the viewing elements on the instrument panel.

The RCAR communications terminal is connected to the different viewing elements via a control bus BC (FIG. 3) and a multiplicity of image busses B1 to Bn, at the rate of one image bus per viewing element.

Transmission of the image data on each of these image busses B1 to Bn is ensured by a transmitting circuit provided in the corresponding viewing element VISU1 to VISUn which has images in real time, according to a standardized digital format of which the interpretation (by the RCAR terminal) is identical for all the viewing elements.

In order to simplify data processing on the images in the RCAR terminal, each viewing element VISU1 to VISUn has a circuit for elaborating standardized data 10, in particular pixel information serving to characterize the pixels according to attributes such as color/luminance.

A compressing circuit 7 which receives the data from the circuit 10 enables reduction of the throughput on the image bus B1, B2, Bn commanded by the transmitting circuit 6.

This compressing circuit 7 can be of the type known as "with no loss of information" and produced with commercially available circuits such as the integrated circuit A HA 33 70 from Advanced Hardware Architectures, which uses a Huffman compression algorithm. This throughput reduction enables the acquisition of the total image by the terminal to be accelerated.

A receiving circuit 8, connected to the control bus BC, enables each viewing element VISU1 to VISUn to receive the commands passed from the RCAR terminal, and to reflect them in the management circuit 9 of the viewing element, then in the readout 11 of the viewing element (switching to reverse video of the selected parameter, incrementation or decrementation of the parameter, page change, etc.).

Furthermore, the management circuit 9 is connected to the compressing circuit 7 via the standard data elaborating circuit 10.

Figure 4:
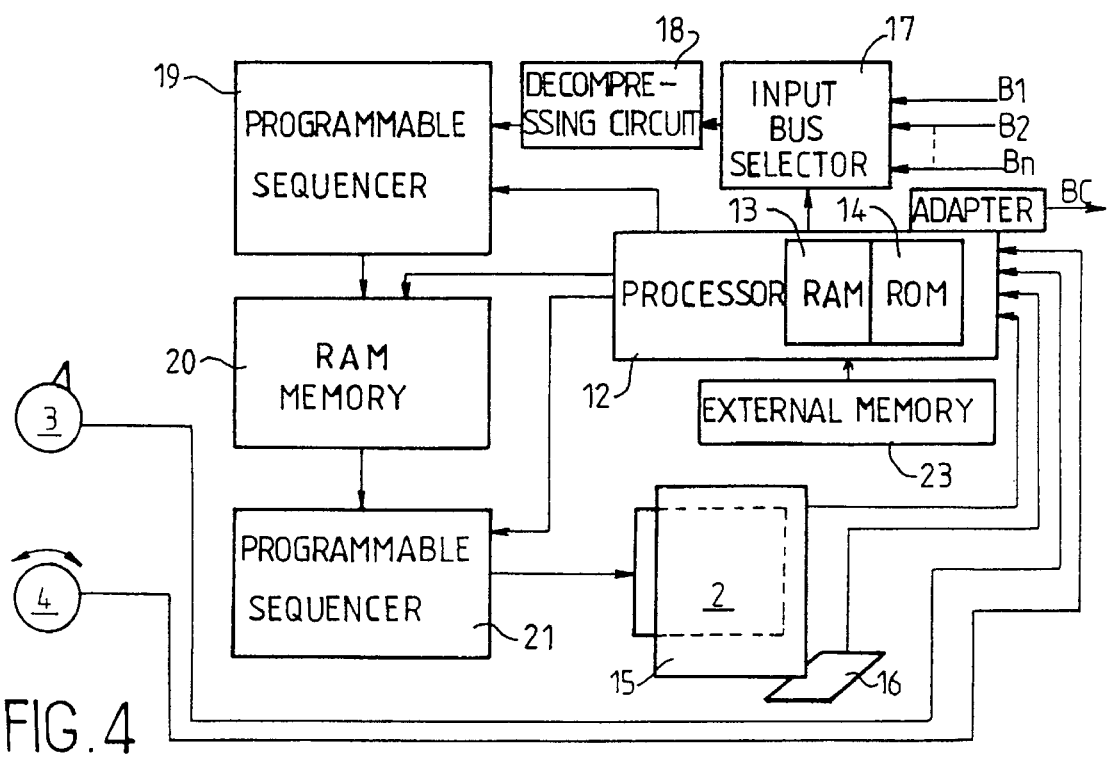
FIG. 4 is a synoptic diagram of a terminal.

More precisely, the RCAR terminal comprises a microprocessor-based processing unit 12 associated in a conventional manner with a RAM 13 and a ROM 14 (FIG. 4).

This processing unit 12 receives the information relating to the status of the selections made by means of the touch-sensitive surface 15 covering the screen 2, the effort detector (schematically represented by block 16) the selector 3, the tuner and validation key 4.

It pilots the image data processing chain which successively comprises an input bus selector 17 which is connected to the image data busses B1, B2, Bn, a decompressing circuit 18 to decompress the image data on the selected bus, a programmable pixel data storage sequencer 19, for storage in a RAM 20 dimensioned so as to ensure storage of the entire image, and a programmable sequencer 21 which reads the data in the memory 20 and manages the presentation of the image on the screen 2.

The programmable sequencer 19 receives, from the processing unit 12, the features of the storage to be performed in the memory 20 as a function of the known features of the viewing element VISU1, VISU2, VISUn selected. Once the selection has been made by the switch 3, it receives, from the processing unit 12, logic initializing equations corresponding to the data storage processing to be performed in the RAM 20. The programmable sequencer 21 receives from the processing unit 12 the logic initializing equations corresponding to the data retrieval processings from the RAM 20, enabling performance of the specific formatting operations concerning the image presented on the screen.

The programmable sequencers 19 and 21 can be manufactured e.g. with integrated circuits of the "Logic Cell Array" or "Field Programmable Gate Array" type proposed under the XILINX trademark, for instance, in which the logic equations of the processings to be performed on the data or inputs can be modified according to requirements under the control of the processing unit 12.

The processing unit 12 is further connected to the control bus BC via an adapter 22, as well as to an external memory 23 assigned to the programs relating to specific modes of the terminal (such as e.g. the "control center" mode, obtained by setting the selector 3 to the PC position). In this case, in addition to the application program, this memory 23 contains data pertaining to the images to be presented on the screen 2.

The input bus selector 17 enables the RCAR terminal to be connected to the image bus B1, B2, Bn of the viewing element VISU1, VISU2, VISUn selected by means of the selector 3. It also ensures adaptation of the signals received.

The decompressing device 18 is designed to perform the reverse operation to that performed by the compressing circuits 7 provided in the viewing elements VISU1, VISU2, VISUn.

It can consist in an A HA 33 71 circuit from Advanced Hardware Architectures.

The digital control bus BC which is common to all the viewing elements VISU1, VISU2, VISUn, is a multireceiver bus, e.g. of the RS 232, ARINC 429 type, or other.

The device previously described operates as follows:

The pilot chooses the presentation mode by action on the selector 3.

If the choice is e.g. VISU1, the processing unit 12, which receives this command, positions the bus selector 17 to the bus B1.

The processing unit 12 then loads the sequencer 19 with the processing equations specific to the features of the viewing element VISU1 (layout, framing, color management, management of specific arrangements, etc.).

The processing unit 12 then loads the read sequencer 21 with the processing equations specific to the extraction of data from the memory 12, depending on the display operation requested (zoom, simplified total image, framing, etc.).

The display data edited by the sequencer 21 are sent to the screen 2 for presentation of the image to the pilot.

The latter can then manipulate the touch-sensitive surface 15 and its integrated effort detector 16 to select e.g. a zoom-in on a detail of the image.

This action, taken into account by the processing unit 12, will entail a new programming of the processing equations of the sequencer 21 in order to then extract the elements of the requested image from the memory 20.

If the pilot then decides to modify a parameter presented on the screen 2 of the RCAR terminal, he presses the touch-sensitive surface 2 in the area corresponding to the parameter to be modified.

This entails the transmission of a control word to the selected viewing element (VISU1 in this instance), which will take this command into account and modify the image presented (e.g. reverse video of the symbol selected).

In addition to the taking into account of the selection of the viewing element and of its display, other consequent processings can then be performed by the viewing element selected, outside of the control of the RCAR terminal. Conversely, the latter will benefit from the information presented on the viewing element and which is reproduced on its screen 2 by means of the bus B1.

In the same way, the parameter modifications commanded by the pilot are transmitted to the bus BC by the adapting circuit 22, then taken into account by a receiving circuit 8 of the viewing element VISU1, VISU2, VISUn selected, and the image generated on the display device 11 of this viewing element will then be copied to the screen 2 of the RCAR terminal.

The invention is of course not limited to a given type of action that the operator can generate subsequent to a solicitation on the touch-sensitive layer of the screen 2 of the RCAR terminal.

So, by way of an example, FIG. 1 shows the RCAR terminal on whose display device is copied a viewing page from the viewing element VISU1 and having several zones Z1, Z2, Z3, Z4, Z5, indicated by rectangular frames inside each of which is inscribed the corresponding function.

The operator can select each zone thus defined by placing his finger on the touch-sensitive surface, directly opposite the zone selected.

Should the operator's next action be an incrementation or decrementation of the parameter displayed in the frame, the development of the modified parameter can be traced both on the viewing element VISU1 and on the RCAR display device which copies the latter.

Advantageously, the effort detector 16 and the touch-sensitive surface 15 associated with it will be designed so as to enable a distinction between a clear-cut pressing of the selection and a light touching of the touch-sensitive surface 15.

In this case, a localized light touching can be interpreted by the central unit 12 as a zoom-in command concerning the activated zone, without any effect on the viewing element selected by the selection means 3.

A clear-cut pressing (a force of pressure exceeding a threshold) on a zone can then be interpreted by the central unit 12 as a system type command, with effect on the viewing element selected.

Furthermore, a broad light touching (e.g. a transversal sweeping of the entire screen) can be interpreted by the central unit 12 as a zoom-out command, without effect on the viewing element selected.

We claim:

1. A terminal enabling dialogue between an operator and a computer system having a processing unit and several viewing elements displaying respective images, said terminal comprising:

a means for selecting a viewing element from said viewing elements, a touch-sensitive screen having a display screen covered by a transparent touch-sensitive surface limited to said terminal and separated from said viewing elements and an image displayed thereon, said display screen of the terminal displaying an image representative of the image displayed on a selected viewing element, irrespective of format, resolution or content thereof, the image displayed on said display screen of the terminal defining on said touch-sensitive surface, touch-sensitive command areas corresponding to display areas of the image displayed on said selected viewing element, said operator being able to transmit a command to the system through manual action on a corresponding touch-sensitive command area of said touch-sensitive command areas a modification of the image displayed on the selected viewing element by a means for enabling transmission to said system of information corresponding to the area designated by said operator, and a means enabling said modification to be made on the image displayed on said display screen of the terminal.

2. The terminal as claimed in claim 1, wherein each of said touch-sensitive command areas has at least one respective function having a label displayed thereon, a manual action of the operator on the touch-sensitive command areas enabling said function to be actuated.

3. The terminal as claimed in claim 1, comprising a means enabling selection of at least one image distinct from said images displayed on the viewing elements, in order to enable the operator to engage in direct dialogue with the system or with said terminal alone.

4. The terminal as claimed in claim 1, comprising the touch-sensitive surface mounted on an effort detection device which provides at least one identification signal which varies as a function of the effort exerted on the touch-sensitive surface and which enables identification of different thresholds which are exceeded by said effort.

5. The terminal as claimed in claim 1, wherein it is connected to the different viewing elements via a control bus and a multiplicity of image busses, at the rate of one image bus per viewing element.

6. The terminal as claimed in claim 1, wherein each viewing element comprises a circuit for elaborating standardized data connected to a transmitting circuit on an image bus via a compressing circuit.

7. The terminal as claimed in claim 4, comprising a microprocessor-based processing unit which receives information relating to an activation status of the touch-sensitive surface, the effort detection device and the selection and validation means, said processing unit piloting an image data processing chain which comprises an input bus selector connected to the viewing elements via respective image data busses, a decompressing circuit to decompress the image data from the selected viewing element, a programmable sequencer for storing pixel data in a RAM memory and a programmable sequencer for reading the pixel data in said RAM memory and for managing presentation of the image on said display screen of the terminal.

8. The terminal as claimed in claim 5, wherein said processing unit is connected to the viewing elements via a control bus and an adapter in order to transmit to the selected viewing element information entered by the operator via the touch-sensitive command areas.

9. The terminal as claimed in claim 1, wherein said processing unit is associated with a memory for storing programs relating to specific modes of said terminal which can be selected by means of said selection means.

10. The terminal as claimed in claim 7, wherein once the selection has been made via the selection means, the programmable sequencer for storing pixel data receives, from the processing unit, a program comprising logic initializing equations corresponding to data storage processings to be performed in the RAM memory.

11. The terminal as claimed in claim 7, wherein the programmable sequencer for reading the pixel data receives from the processing unit a program comprising logic initializing equations corresponding to data retrieval processings to be performed from the RAM memory, enabling performance of formatting operations concerning the image presented on the display screen.

12. The terminal as claimed in claim 4, wherein the touch-sensitive surface associated with its effort detection device enables a distinction to be made between a clear-cut pressing of a selection and a light touching thereof.

13. The terminal as claimed in claim 12, wherein a localized light touching on a zone of the touch-sensitive surface is interpreted by a processing unit as a zoom-in command concerning an image zone of said display screen corresponding with said zone, without any effect on the viewing element selected by the selection means.

14. The terminal as claimed in claim 12, wherein a clear-cut pressing on a zone of the touch-sensitive surface is interpreted by the processing unit as a system type command, with effect on the viewing element selected.

15. The terminal as claimed in claim 12, wherein a broad light touching (a transversal sweeping of the entire display screen) is interpreted by the processing unit as a zoom-out command, without effect on the viewing element selected.

* * * * *